(12) United States Patent
Cöster et al.

(10) Patent No.: US 9,510,284 B2
(45) Date of Patent: Nov. 29, 2016

(54) METHOD, NETWORK DEVICE, COMPUTER PROGRAM AND COMMUTER PROGRAM PRODUCT FOR DETERMINING POWER STATE PARAMETERS

(71) Applicant: Telefonaktiebolaget L M Ericsson (publ), Stockholm (SE)

(72) Inventors: Rickard Cöster, Hägersten (SE); Vincent Huang, Sollentuna (SE); Mona Matti, Nacka (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/442,315

(22) PCT Filed: Nov. 14, 2012

(86) PCT No.: PCT/EP2012/072623
§ 371 (c)(1),
(2) Date: May 12, 2015

(87) PCT Pub. No.: WO2014/075717
PCT Pub. Date: May 22, 2014

(65) Prior Publication Data
US 2015/0351030 A1    Dec. 3, 2015

(51) Int. Cl.
*G08C 17/00*     (2006.01)
*H04W 52/02*     (2009.01)
*H04W 76/04*     (2009.01)
*H04W 88/02*     (2009.01)

(52) U.S. Cl.
CPC ..... *H04W 52/0216* (2013.01); *H04W 52/0258* (2013.01); *H04W 76/048* (2013.01); *H04W 88/02* (2013.01); *Y02B 60/50* (2013.01)

(58) Field of Classification Search
None
See application file for complete search history.

(56) References Cited

U.S. PATENT DOCUMENTS

| 2010/0128645 | A1 | 5/2010 | Lin et al. | |
| 2010/0144299 | A1* | 6/2010 | Ren | H04B 1/1615 455/226.1 |
| 2012/0057513 | A1* | 3/2012 | Kong | H04W 52/0216 370/311 |

(Continued)

FOREIGN PATENT DOCUMENTS

WO    WO 2013/051865 A2    4/2013

OTHER PUBLICATIONS

Office Action in EP application No. 12788183.7 mailed Jan. 4, 2016.

(Continued)

*Primary Examiner* — Otis L Thompson, Jr.
(74) *Attorney, Agent, or Firm* — Patent Portfolio Builders, PLLC (57) ABSTRACT

A method, performed by a network device, is disclosed for determining a set of power state parameters at least partly defining when a wireless terminal is to be in an active state or a power saving state. The method includes the steps of: detecting a present traffic type of a traffic flow to or from a wireless terminal; obtaining, from a power state parameter repository, a set of power state parameters corresponding to a plurality of traffic types, including the present traffic type; transmitting the set of power state parameters to the wireless terminal; detecting a further traffic type of a traffic flow to or from the wireless terminal; and modifying the power state parameters for the wireless terminal, only when the further traffic type does not comply with at least one expected future traffic type of the plurality of traffic types.

15 Claims, 3 Drawing Sheets

(56) References Cited

U.S. PATENT DOCUMENTS

| | | |
|---|---|---|
| 2012/0120828 A1 | 5/2012 | Anderson et al. |
| 2012/0207069 A1 | 8/2012 | Xu et al. |
| 2012/0213116 A1* | 8/2012 | Koo .................... H04B 1/1027 370/253 |
| 2013/0301500 A1* | 11/2013 | Koc .................... H04W 76/048 370/311 |
| 2013/0308507 A1* | 11/2013 | Wanstedt .......... H04W 52/0216 370/311 |

OTHER PUBLICATIONS

International Search Report, PCT Application No. PCT/EP2012/072623, Jul. 8, 2013.

Written Opinion of the International Searching Authority, PCT Application No. PCT/EP2012/072623, Jul. 8, 2013.

* cited by examiner

METHOD, NETWORK DEVICE, COMPUTER PROGRAM AND COMMUTER PROGRAM PRODUCT FOR DETERMINING POWER STATE PARAMETERS

CROSS REFERENCE TO RELATED APPLICATION

This application is a 35 U.S.C. § 371 national stage application of PCT International Application No. PCT/EP2012/072623, filed on 14 Nov. 2012, the disclosure and content of which is incorporated by reference herein in its entirety. The above-referenced PCT International Application was published in the English language as International Publication No. WO 2014/075717 A1 on 22 May 2014.

TECHNICAL FIELD

The invention relates to determining power state parameters for wireless terminals, the power state parameters at least partly defining when a wireless terminal is to be in an active state or a power saving state.

BACKGROUND

In cellular networks, wireless terminals are often battery powered. Hence power usage in wireless terminals is always under scrutiny and any reduction in power usage is beneficial for the end user and the society at large.

In order to save power in the wireless terminal, DRX (Discontinuous Reception) can be used. A DRX cycle consists of an ON duration and an OFF duration. No data can be received during the energy saving OFF duration. If data is received in downlink during the ON duration, or if data is sent via uplink at any time, the wireless terminal will enter an active state and start an inactivity timer.

DRX is configured per wireless terminal and is governed by a set of power state parameters. However, it is not evident how to set the power state parameters. On the one hand, it is desired to save power. But on the other hand, negative effects resulting from setting the wireless terminal in an inactive state, even temporarily, should be avoided if possible.

The current solutions to setting the power state parameters are based on selecting power state parameters based on service class (e.g. Voice over Internet Protocol (VoIP), video conversation, etc.). However, it would be greatly beneficial if the setting of power state parameters could be improved even further, to more closely reflect traffic usage in the wireless terminal.

SUMMARY

It is an object to improve how power state parameters are determined for when several traffic types are present for a wireless terminal.

According to one embodiment, it is presented a method, performed by a network device, for determining a set of power state parameters at least partly defining when a wireless terminal is to be in an active state or a power saving state. The method comprises the steps of: detecting a present traffic type of a traffic flow to or from a wireless terminal; obtaining, from a power state parameter repository, a set of power state parameters corresponding to a plurality of traffic types, including the present traffic type; transmitting the set of power state parameters to the wireless terminal; detecting a further traffic type of a traffic flow to or from the wireless terminal; and modifying the power state parameters for the wireless terminal, only when the further traffic type does not comply with at least one expected future traffic type of the plurality of traffic types. By selecting a set of power state parameters corresponding to a plurality of traffic types, as long as following traffic types are part of the plurality of traffic types, the power state parameters do not need to be changed. This prevents, unnecessary and resource consuming power state parameter reconfiguration, in many cases.

In the step of obtaining a set of power state parameters, the plurality of traffic types may be in the form of a sequence of traffic types, wherein an initial set of traffic types of the sequence of traffic types, comprises the present traffic type.

In the step of obtaining a set of power state parameters, the initial set of traffic types further may comprise at least one previous traffic type. In other words, preceding traffic types are considered when determining the set of power state parameters.

The method may further comprise the step of: for at least one initial set of traffic types, determining a sequence of most likely future traffic types. This can e.g. use previously determined Markov chains to find the most likely sequence of traffic types.

In the step of determining the sequence, the sequence may end when a combined probability for the sequence, given the initial traffic type, is less than a threshold probability.

In the step of determining the sequence, the sequence may end at a predetermined number of traffic types.

In the step of determining the sequence, the sequence may end when an expected sequence duration exceeds a threshold value.

The step of determining a sequence may comprise determining the sequence of most likely traffic types based on data associated with the wireless terminal which is associated with the traffic flow in the step of detecting a present traffic type.

The step of determining a sequence may comprise determining the sequence of most likely traffic types based on data without discrimination on wireless terminals.

The step of determining a sequence may comprise determining the sequence of most likely traffic types based on data for a subset of wireless terminals comprising the wireless terminal.

According to a second aspect, it is presented a network device arranged to determine a set of power state parameters at least partly defining when a wireless terminal is to be in an active state or a power saving state. The network device comprises: a processor; and a computer program product storing instructions that, when executed by the processor, causes the network device to: detect a present traffic type of a traffic flow to or from a wireless terminal; obtain, from a power state parameter repository, a set of power state parameters corresponding to a plurality of traffic types, including the present traffic type; transmit the set of power state parameters to the wireless terminal; detect a further traffic type of a traffic flow to or from the wireless terminal; and modify the power state parameters for the wireless terminal, only when the further traffic type does not comply with at least one expected future traffic type of the plurality of traffic types.

The plurality of traffic types may be in the form of a sequence of traffic types, wherein an initial set of traffic types of the sequence of traffic types comprises the present traffic type.

The initial set of traffic types may further comprise at least one previous traffic type.

The network device may further comprise instructions to: for at least one initial traffic type, determine a sequence of most likely traffic types, wherein the first traffic type is the respective initial traffic type.

The instructions to determine the sequence may comprise instructions to end the sequence when a combined probability for the sequence, given the initial traffic type, is less than a threshold probability.

The instructions to determine the sequence may comprise instructions to end the sequence at a predetermined number of traffic types.

The instructions to determine the sequence may comprise instructions to end the sequence when an expected sequence duration exceeds a threshold value.

The instructions to determine the sequence may comprise instructions to determine the sequence of most likely traffic types based on data associated with the wireless terminal which is associated with the traffic flow in the step of detecting a present traffic type.

The instructions to determine the sequence may comprise instructions to determine the sequence of most likely traffic types based on data without discrimination on wireless terminals.

The instructions to determine the sequence may comprise instructions to determine the sequence of most likely traffic types based on data for a subset of wireless terminals comprising the wireless terminal.

According to a third aspect, it is presented a computer program for determining a set of power state parameters at least partly defining when a wireless terminal is to be in an active state or a power saving state. The computer program comprises computer program code which, when run on a network device, causes the network device to: detect a present traffic type of a traffic flow to or from a wireless terminal; obtain, from a power state parameter repository, a set of power state parameters corresponding to a plurality of traffic types, including the present traffic type; transmit the set of power state parameters to the wireless terminal; detect a further traffic type of a traffic flow to or from the wireless terminal; and modify the power state parameters for the wireless terminal, only when the further traffic type does not comply with at least one expected future traffic type of the plurality of traffic types.

According to a fourth aspect, it is presented a computer program product comprising a computer program according to the third aspect and a computer readable means on which the computer program is stored.

It is to be noted that any feature of the first, second, third, fourth and fifth aspects may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, unit, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
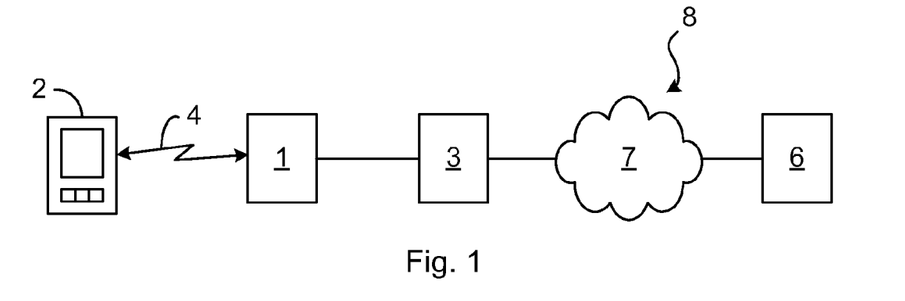
FIG. 1 is a schematic diagram illustrating an environment where embodiments presented herein can be applied.

FIG. 1 is a schematic diagram illustrating a cellular network 8 where embodiments presented herein may be applied. The cellular network 8 comprises a core network 3 and one or more radio base stations 1, here in the form of evolved Node Bs, also known as eNode Bs or eNBs. The radio base stations 1 could also be in the form of Node Bs, BTSs (Base Transceiver Stations) and/or BSSs (Base Station Subsystems), etc. The radio base stations 1 provide radio connectivity to a plurality of wireless terminals 2. The term wireless terminal is also known as mobile communication terminal, user equipment, mobile terminal, user terminal, user agent, machine-to-machine devices etc., and can be, for example, what today are commonly known as a mobile phone or a tablet/laptop with wireless connectivity or fixed mounted terminal. Moreover, the wireless terminals 2 may but do not need to, be associated with a particular end user.

The cellular network 8 may e.g. comply with any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink communication (from the wireless terminal) and downlink communication (to the wireless terminal) between each wireless terminal 2 and the radio base station 1 occur over a wireless radio interface 4. The quality of the wireless radio interface 4 to each wireless terminal 2 can vary over time and depending on the position of the wireless terminal 2, due to effects such as fading, multipath propagation, etc.

The radio base stations 1 are also connected to the core network 3 for connectivity to central functions and a wide area network 7, such as the Internet. One or more content servers 6 are also connected to the wide area network 7. In this way, the wireless terminal 2 can request content, such as video, audio, images, text, etc., from the content servers 6. When appropriate, such as for video and/or audio, the content can be delivered in a traffic flow using a suitable protocol, e.g. HTTP (Hypertext transfer protocol), RTP (Real-time Transport Protocol) or application specific protocols on TCP (Transmission Control Protocol) or UDP (User Datagram Protocol).

Figure 2:
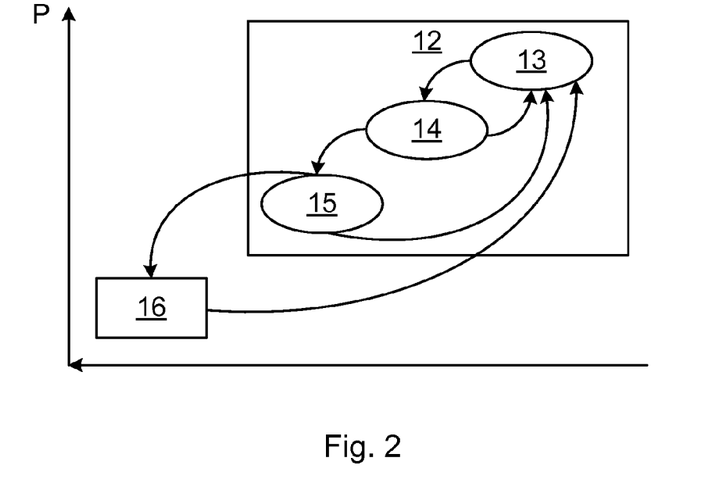
FIG. 2 is a state diagram illustrating various power states for a wireless terminal of FIG. 1.

FIG. 2 is a state diagram illustrating various power states for a wireless terminal of FIG. 1. Each state uses an average power and involves an average latency for communication. In the diagram of FIG. 2, states further to the left involve a greater latency and states further up involve greater average power usage for the wireless terminal in question.

The states are used for Discontinuous Reception (DRX), which is a feature provided in LTE/E-UTRAN (Evolved UMTS Terrestrial Radio Access Network) for power saving in the wireless terminal, reducing battery consumption. A DRX cycle consists of an ON period of an ON duration and an OFF period of an OFF duration. No data can be received during the energy saving OFF duration. If data is received in downlink during the ON duration, or if data is sent via uplink, the wireless terminal will stay awake and start an inactivity timer.

There are two main states shown in FIG. 2, an RRC_IDLE state 16 and an RRC_CONNECTED state 12. In DRX, the RRC_CONNECTED state 12 comprises three individual states: a long DRX state 15, a short DRX state 14 and an active state 13. The active state 13 is above the other states 14, 15, 16 in the diagram of FIG. 2, thereby using more power. Hence, the short DRX state 14, the long DRX state and the RRC_IDLE state 16 are throughout this description and claims known as power saving states. In other words, the power saving states 14, 15, 16 all use less power on average than the active state 13.

When in one of the long and short DRX states 14-15, the wireless terminal does not constantly monitor the PDCCH (Physical Downlink Control Channel) every TTI (Transmission Time Interval), but only during specific time intervals. During these non-active states 14-15, the wireless terminal can go into power saving OFF period for part of the time that decreases the power consumption.

Hence, two DRX cycles can be set for each wireless terminal: a short DRX cycle and a long DRX cycle for the short DRX state 14 and the long DRX state 15, respectively. When the wireless terminal is in the active state 13, a inactivity timer is started after a downlink packet is received. When the inactivity timer expires, the wireless terminal switches to the short DRX state 14. In the short DRX state 14, the wireless terminal can only receive packets during the ON duration.

If a packet is received while in the short DRX state 14, the wireless terminal returns to the active state 13. Otherwise, a short DRX cycle Timer is started. When the short DRX cycle Timer expires, the wireless terminal switches to the long DRX state 15. In the long DRX state, the wireless terminal can switch to the RRC_IDLE state 16 when an inactivity timer expires. If a data packet is received during the ON Duration of the long DRX state 15, the wireless terminal returns to the active state 13 directly, without passing via the short DRX state 14. Uplink data packets always trigger the wireless terminal switching to the active state 13, if not already there.

From the RRC_IDLE state 16, a random access procedure is required to get the wireless terminal back to the RRC_CONNECTED state 12 in general, and the active state 13 in particular.

There are a number of power state parameters that can be configured in the DRX state, such as On Duration, the inactivity timer, the short DRX cycle timer, the long DRX cycle timer, the duration of the short DRX cycle, the duration of the long DRX cycle, retransmission timer, start offset, etc. These power state parameters can be configured for each wireless terminal separately and thus at least partly define when the wireless terminal is to be in an active state or one of the power saving states 14, 15, 16. The retransmission timer parameter specifies the maximum number of consecutive PDCCH (Physical Downlink Control Channel) subframes the wireless terminal should remain active to be ready to receive an incoming retransmission after the first available retransmission time. The start offset parameter is an offset for each wireless terminal so that, in the time domain, not all wireless terminals start receiving at the same time.

Figure 3A:
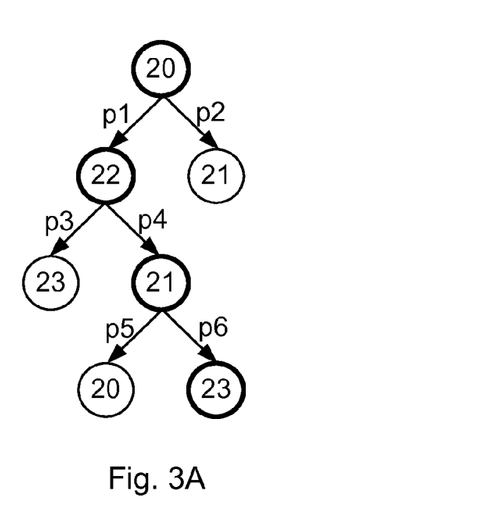
FIGS. 3A-B are schematic diagrams illustrating sequences of traffic types.
Figure 3B:
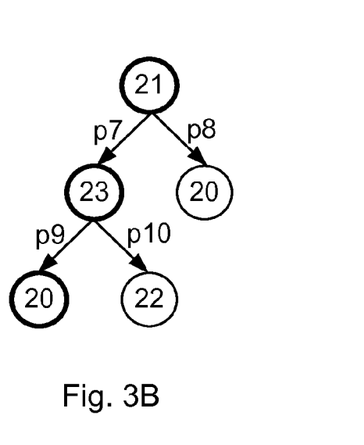

FIGS. 3A-B are schematic diagrams illustrating sequences of traffic types. Traffic type is here to be construed as any relevant categorisation of the type of traffic of a traffic flow. This can be on a service level, such as: voice over Internet Protocol (VoIP), video conference, video streaming, audio streaming, web browsing, peer-to-peer traffic, media downloads, and software downloads. Alternatively or additionally, the traffic type can categorised on a more detailed level such as particular service, e.g. YouTube, Netflix, Facebook, etc. Alternatively or additionally, the traffic type can be categorised on a specific application, such as Windows Media Player, Google Earth, Spotify, etc. In one embodiment, a silent (no traffic) period is also a traffic type, allowing sequencing of traffic types to be done when one stage is a silent stage. The categorisation into traffic types can be based on a previous categorisation performed at an earlier stage (and thus associated with the traffic flow). Alternatively or additionally, the categorisation into traffic types can be performed using packet inspection. The packet inspection can be performed in the network device or any other node between the content source and the network device.

Packet inspection can e.g. involve shallow packet inspection, Deep Packet Inspection (DPI) and/or heuristic inspection. Shallow packet inspection identifies services based on IP header information such as IP addresses, ports and transmission protocol. Deep packet inspection performs state dependent analysis of the protocol, to identify application specific information such as content URLs or application events. Heuristic inspection inspects the traffic based on empirical data about the traffic properties, such as patterns characteristic of a particular protocol or application.

The categorisation into traffic type can then e.g. use the packet context and state dependent flow analysis information obtained during the inspection phase to classify the packet into the right traffic type according to classification rules.

Embodiments presented herein are based on the realisation that many times the behaviour of a user, in terms of the used traffic types, is the same. For example, a common behaviour of users of wireless terminals can be to first check Facebook, then check and read a couple of e-mails and then a longer period of web browsing.

Hence, by setting a set of power state parameters which is beneficial for all traffic types in a sequence of traffic types, if the user follows the sequence, the set of power state parameters do not need to be changed. In this way, unnecessary and resource consuming power state parameter reconfiguration can many times be avoided. If the behaviour steps outside a predicted sequence, the power state parameters can be set in accordance with the traffic type which does not comply with the sequence. In other words, worst case, the prediction is wrong every single time, whereby a situation as in the prior art results, where reconfiguration is considered for every new traffic type. Hence, even a very low accuracy rate will result in a real improvement, avoiding at least some reconfigurations of power state parameters. Higher accuracy rates will result in increasing improvement over the prior art.

In order to exploit this, at least sometimes, predictable behaviour, sequences of traffic types are obtained, which will now be explained with reference to FIGS. 3A-B.

The sequences shown in FIG. 3A-B can be viewed as a Markov chains proceeding downwards. Each state represents a current traffic type to or from the wireless terminal.

In FIG. 3A a first sequence of traffic types is presented. Here, the chain starts with a first traffic type 20. Starting from the first traffic type 20, a second traffic type 21 can occur, with a probability of p2 or a third traffic type 22 can occur with a probability of p1. In this example, the probability p1 is greater than the probability p2, whereby the most likely next traffic type, starting from the first traffic type 20, is the third traffic type 22. This is indicated in FIG. 3A by the third traffic type 22 having a circle with a thicker line.

Looking now to the third traffic type 22 after the first traffic type 20, a fourth traffic type 23 can occur, with a probability of p3 or the second traffic type can occur with a probability of p4. In this example, the probability p4 is greater than the probability p3, whereby the most likely next traffic type, starting from the third traffic type 22 (after the first traffic type 20), is the second traffic type 21. This is indicated in FIG. 3A by the second traffic type 21 having a circle with a thicker line.

Looking now to the second traffic type 21 after the first traffic type 20 and the third traffic type 22, the first traffic type 20 can occur, with a probability of p5 or the fourth traffic type 23 can occur with a probability of p6. In this example, the probability p6 is greater than the probability p5, whereby the most likely next traffic type, starting from the second traffic type 21 (after the first traffic type 20 and the third traffic type 22), is the fourth traffic type 23. This is indicated in FIG. 3A by the fourth traffic type 23 having a circle with a thicker line.

In FIG. 3B a second sequence of traffic types is presented. Here, the chain starts with the second traffic type 21. Starting from the second traffic type 21, the fourth traffic type 23 can occur, with a probability of p7 or the first traffic type 20 can occur with a probability of p8. In this example, the probability p7 is greater than the probability p8, whereby the most likely next traffic type, starting from the second traffic type 21, is the fourth traffic type 23. This is indicated in FIG. 3B by the fourth traffic type 23 having a circle with a thicker line Looking now to the fourth traffic type 23 after the second traffic type 21, the first traffic type 20 can occur, with a probability of p9 or the third traffic type 22 can occur with a probability of p10. In this example, the probability p9 is greater than the probability p10, whereby the most likely next traffic type, starting from the fourth traffic type 23 (after the second traffic type 21), is the first traffic type 20. This is indicated in FIG. 3B by the first traffic type 20 having a circle with a thicker line.

Figure 4A:
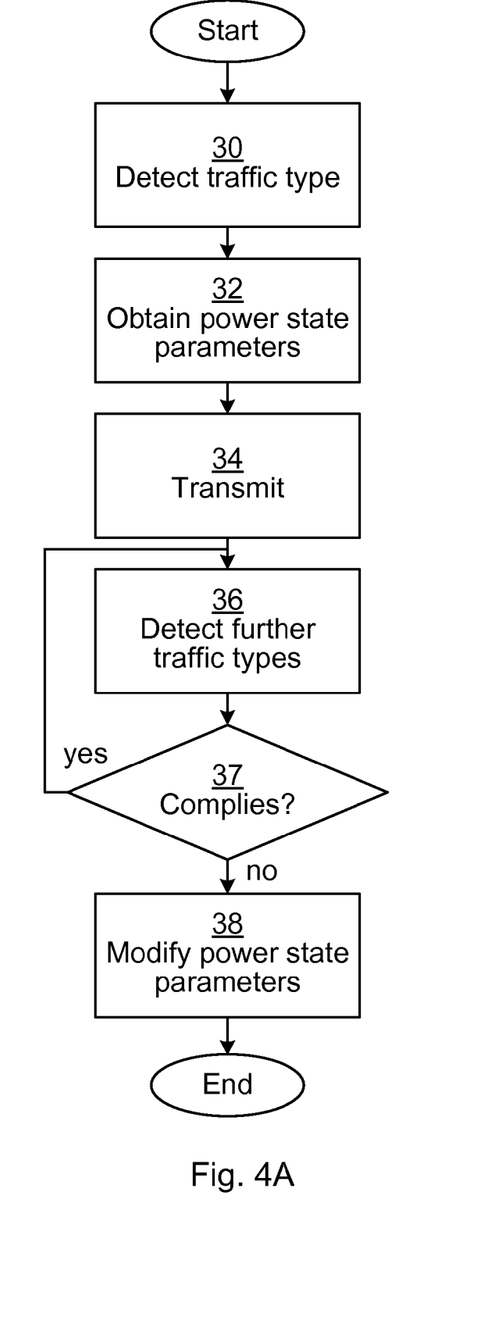
FIGS. 4A-B are flow charts illustrating methods performed in a network device of FIG. 5.
Figure 4B:
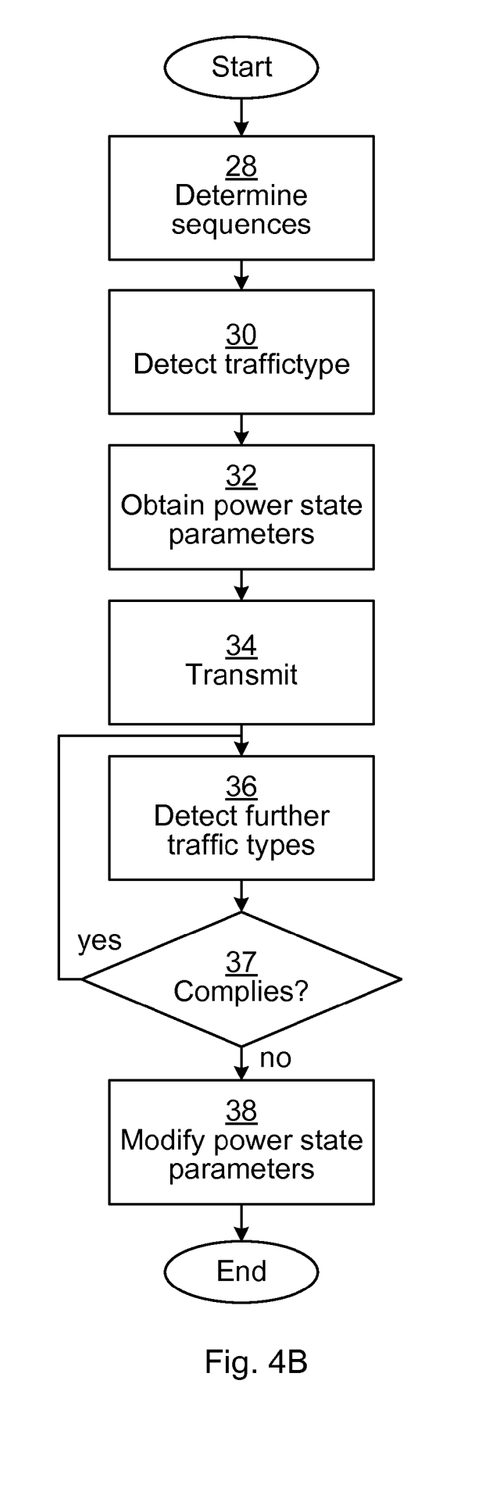

FIGS. 4A-B are flow charts illustrating methods performed in a network device (see FIGS. 5 and 6A-D below). The method determines a set of power state parameters at least partly defining when a wireless terminal is to be in an active state or a power saving state.

As mentioned above, the power state parameters can include On Duration, the inactivity timer, the short DRX cycle timer, the long DRX cycle timer, the duration of the short DRX cycle, the duration of the long DRX cycle, retransmission timer, start offset, etc.

In one embodiment, all of these power state parameters are determined. In another embodiment, a subset of these parameters are determined by these methods, such as the short DRX cycle timer, inactivity timer, the duration of the short DRX cycle, but not parameters related to the DRX long cycle.

Firstly, the method illustrated by the flow chart in FIG. 4A will be described, with some references to FIGS. 3A-B.

In an initial detect traffic type step, a present traffic type of a traffic flow to or from the wireless terminal is obtained. The traffic type can relate to downlink and/or uplink data. The traffic flow is analysed and measurements can be obtained. Optionally, one or more other traffic characterisation parameters, other than the traffic type, can be used, such as packet inter arrival times, packet rate, burst length and burst size. Packet rate indicates the rate at which packets are received. Burst length indicates a duration of a burst and burst size indicates the number of packets of a burst. A burst can be defined as a set of packets where the inter arrival time is less than a particular threshold.

As described above, the traffic types can be obtained using deep packet inspection to determine a traffic type for each one of the plurality of traffic flows. Alternatively or additionally, as described above, the traffic type can be obtained using a previous traffic type determination, which is associated with the traffic flow in question and communicated to the network device.

Figure 5:
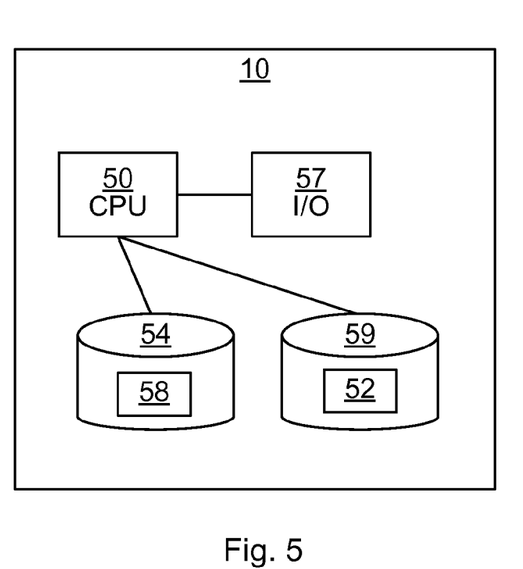
FIG. 5 is a schematic diagram illustrating some components of the network device.

In an obtain power state parameters step 32, power state parameters are obtained from a power state parameter repository 52 (FIG. 5). The set of power state parameters corresponds to a plurality of traffic types, including the present traffic type. The present traffic type is used to find the set of power state parameters.

Optionally, the plurality of traffic types is in the form of a sequence of traffic types. In that case, an initial set of traffic types of traffic the sequence of traffic types comprises the present traffic type.

Optionally, the initial set of traffic types further comprises at least one previous traffic type. This corresponds to this step being performed when the present traffic type is the third traffic type 22 in FIG. 3A.

For example, if the present traffic type is the first traffic type 20, a set of power state parameters related to the first sequence shown in FIG. 3A is obtained from the power state parameter repository. The plurality of traffic types in this case is the sequence of traffic types of FIG. 3A indicated with thick lines, optionally restricted in length.

On the other hand, if the present traffic type is the second traffic type 21, a set of power state parameters related to the second sequence shown in FIG. 3B is obtained from the power state parameter repository. The plurality of traffic types in this case is the sequence of traffic types of FIG. 3B indicated with thick lines, optionally restricted in length.

In the transmit step 34, the set of power state parameters is transmitted to the wireless terminal. In this way, the wireless terminal is updated with the power state parameters that have been found.

When the power state parameters are transmitted to the wireless terminal, messages such as RRC CONNECTION RECONFIGURATION or RRC CONNECTION SETUP can be used.

Optionally, the applicable set of power state parameters are sent to the wireless terminal only when the set of power state parameters differ more than a threshold amount from a currently active set of power state parameters of the wireless terminal in operation. In other words, optionally, there needs to be a significant change in power state parameters for it to be valuable to send the new set of power state parameters.

Optionally, the applicable set of power state parameters are sent to the wireless terminal only when the set of power state parameters differs from a currently active set of power state parameters of the wireless terminal in operation for more than a threshold duration. In other words, optionally, there needs to be a change in power state parameters for a significant duration for it to be valuable to send the new set of power state parameters.

In a detect further traffic types step 36, a further traffic type of a traffic flow to or from the wireless terminal is detected. In other words, the wireless terminal has transitioned from a state of a first traffic type to a second traffic type.

In a conditional complies step 37, it is determined whether the further traffic type complies with at least one expected future traffic type of the plurality of traffic types. This can e.g. be performed by evaluating the further traffic type to see if it complies with a predicted sequence of traffic types.

If this condition is true, the method returns to the detect further traffic types step 36. Otherwise, the method proceeds to a modify power state parameters step 38.

In the modify power state parameters step 38, the power state parameters are modified for the mobile communication terminal. The modification can be based on the further traffic type.

In this way, the power state parameters are only modified when a non-compliance with the expected future traffic types. At other times, the currently active power state parameters remain active, with no reconfiguration.

Now, the method illustrated by the flow chart of FIG. 4B will be described. The steps of the method illustrated in FIG. 4A have corresponding steps in this method and will not be described again, unless they are modified in some way in this method.

In this embodiment, there is a determine sequences step 28 prior to the detect traffic type step 30. In the determine sequences step 28, a sequence of most likely future traffic types is determined for at least one set of initial set of traffic types. This is done, e.g. by calculating the probabilities of the next traffic type, such as p1-p10 shown in FIGS. 3A-B.

The length of the sequence may need to be limited in some way.

In one embodiment, the sequence ends when a combined probability for the sequence, given the initial traffic type, is less than a threshold probability. The combined probability can be calculated by multiplying all probabilities in a sequence.

In one embodiment, the sequence ends when an expected sequence duration exceeds a threshold value.

In one embodiment, the sequence determining is based on data associated with the wireless terminal being associated with the traffic flow in the detect traffic type step 30. In this way, the sequence determination is tailored to the user of that particular wireless terminal. The probability calculation is then based on traffic type sequences of the particular wireless terminal. The wireless terminal could here either be a particular type of wireless terminal or it could be an identity of a particular instance of a wireless terminal.

In one embodiment, the sequence determining is based on data without discrimination on wireless terminals. In other words, global data is used to determine the sequences and probabilities. The probability calculation can then be based on traffic type sequences globally in the network. This gives a larger statistical base and possibly higher accuracy on average.

In one embodiment, the sequence determining is based on data for a subset of wireless terminals comprising the wireless terminal. The probability calculation is then based on traffic type sequences of a group of wireless terminals, comprising the particular wireless terminal. This is a compromise between user tailored probability calculation and larger statistical base.

For each determined sequence, a set of power state parameters are found, which matches all the traffic types of the sequence. The power state parameters can e.g. be found by simulating a large number of sets of power state parameters, and evaluating the performance of each set of power state parameters for the traffic types of the sequence. The result of the simulation is then stored in the power state parameter repository, such that it can be used later for real sequences of traffic types.

FIG. 5 is a schematic diagram showing some components of the network device 10 arranged to execute the methods of FIGS. 4A-B. The components shown here can be components used from a host device containing the network device 10, or components for the network device 10, separate from the host device. A processor 50 is provided using any combination of one or more of a suitable central processing unit (CPU), multiprocessor, microcontroller, digital signal processor (DSP), application specific integrated circuit etc., capable of executing software instructions contained in a computer program 58 stored in a computer program product 54, e.g. in the form of a memory, but not in the form of a signal or any form of electromagnetic wave. The processor 50 can be configured to execute the method described with reference to FIGS. 4A-B above.

The computer program product 54 is here a memory being any combination of read-and-write memory (RAM) and read-only memory (ROM). The memory also comprises persistent storage, which, for example, can be any single one or combination of magnetic memory, optical memory, solid state memory or even remotely mounted memory. The processor 50 controls the general operation of the network device 10.

The network device 10 further comprises a data memory 59, which is a read-and-write memory. The data memory 59 may also comprises persistent storage, which, for example, can be any single one or combination of magnetic memory, optical memory, solid state memory or even remotely mounted memory. The data memory 59 comprises a power state parameter repository 52, comprising one or more sets of power state parameters which are applicable for a combination of traffic types. Optionally, the computer program product 54 and the data memory 59 can form part of the same memory device.

The network device 10 further comprises an I/O interface 57 for communicating with external entities, e.g. to be able to capture traffic flows. Other components of the network device 10 are omitted in order not to obscure the concepts presented herein.

FIGS. 6A-D are schematic diagrams illustrating various locations where the network device of FIG. 5 can be implemented. The network device 10 determines a set of power state parameters for one or more wireless terminals, using traffic flows. Hence, the network device can be located in, or in conjunction to, any host device anywhere along the path between the end wireless terminal 2 and the content server 6 (FIG. 1).

Figure 6A:
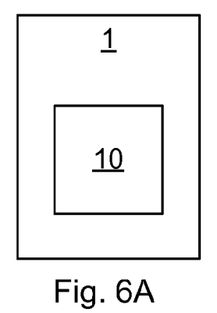
FIGS. 6A-D are schematic diagram illustrating various locations where the network device of FIG. 5 can be implemented.

In FIG. 6A, an embodiment is shown where the network device 10 is located in the radio base station 1.

Figure 6B:
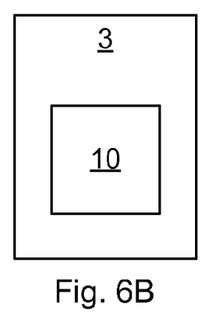

In FIG. 6B, an embodiment is shown where the network device 10 is located in the core network, 3, such as in or by an SGSN (Serving GPRS (General Packet Radio Service) Support Node), a GGSN (Gateway GPRS Support Node), a Serving Gateway, or a Packet Data Network Gateway.

Figure 6C:
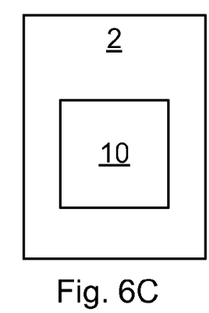
Figure 6D:
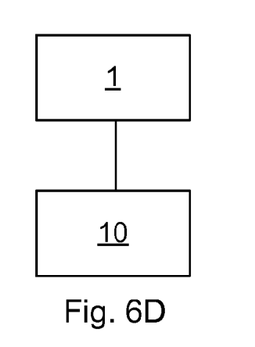

In FIG. 6C, an embodiment is shown where the network device 10 is located in the wireless terminal 2. In FIG. 6D, an embodiment is shown where the network device 10 is located with direct communication with the radio base station 1.

Optionally, different network devices 10 or different parts of the network device 10 can be housed in multiple devices.

Figure 7:
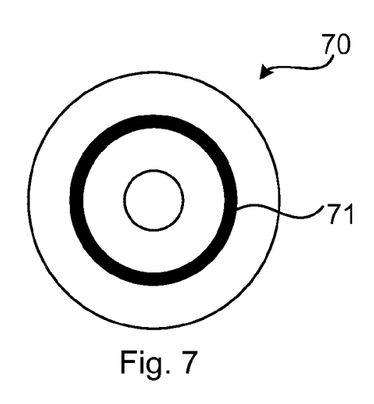
FIG. 7 shows one example of a computer program product 70 comprising computer readable means.

FIG. 7 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54 of FIG. 5. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed by a network device, for determining a set of power state parameters at least partly defining when a wireless terminal is to be in an active state or a power saving state, the method comprising the steps of:
    detecting a present traffic type of a traffic flow to or from a wireless terminal;
    obtaining, from a power state parameter repository, a set of power state parameters corresponding to a plurality of traffic types, including the present traffic type, wherein the plurality of traffic types is in the form of a sequence of traffic types, wherein an initial set of traffic types of the sequence of traffic types, comprises the present traffic type;
    transmitting the set of power state parameters to the wireless terminal;
    detecting a further traffic type of a traffic flow to or from the wireless terminal;
    modifying the power state parameters for the wireless terminal, only when the further traffic type does not comply with at least one expected future traffic type of the plurality of traffic types; and
    determining, for at least one initial set of traffic types, a sequence of most likely future traffic types, wherein the sequence of most likely future traffic types ends at a predetermined number of traffic types.

2. The method according to claim 1, wherein in the step of obtaining a set of power state parameters, the initial set of traffic types further comprises at least one previous traffic type.

3. The method according to claim 1, wherein the step of determining a sequence comprises determining the sequence of most likely traffic types based on data associated with the wireless terminal which is associated with the traffic flow in the step of detecting a present traffic type.

4. The method according to claim 1, wherein the step of determining a sequence comprises determining the sequence of most likely traffic types based on data without discrimination on wireless terminals.

5. The method according to claim 1, wherein the step of determining a sequence comprises determining the sequence of most likely traffic types based on data for a subset of wireless terminals comprising the wireless terminal.

6. A network device arranged to determine a set of power state parameters at least partly defining when a wireless terminal is to be in an active state or a power saving state, the network device comprising:
    a processor; and
    a memory storing instructions that, when executed by the processor, causes the network device to:
    detect a present traffic type of a traffic flow to or from a wireless terminal;
    obtain, from a power state parameter repository, a set of power state parameters corresponding to a plurality of traffic types, including the present traffic type, wherein the plurality of traffic types is in the form of a sequence of traffic types, wherein an initial set of traffic types of the sequence of traffic types comprises the present traffic type;
    transmit the set of power state parameters to the wireless terminal;
    detect a further traffic type of a traffic flow to or from the wireless terminal; and
    modify the power state parameters for the wireless terminal, only when the further traffic type does not comply with at least one expected future traffic type of the plurality of traffic types; and
    determine, for at least one initial traffic type, a sequence of most likely traffic types, wherein the instructions to determine the sequence comprise instructions to end the sequence at a predetermined number of traffic types.

7. The network device according to claim 6, wherein the initial set of traffic types further comprises at least one previous traffic type.

8. The network device according to claim 6, wherein the instructions to determine the sequence comprise instructions to determine the sequence of most likely traffic types based on data associated with the wireless terminal which is associated with the traffic flow in the step of detecting a present traffic type.

9. The network device according to claim 6, wherein the instructions to determine the sequence comprise instructions to determine the sequence of most likely traffic types based on data without discrimination on wireless terminals.

10. The network device according to claim 6, wherein the instructions to determine the sequence comprise instructions to determine the sequence of most likely traffic types based on data for a subset of wireless terminals comprising the wireless terminal.

11. A method, performed by a network device, for determining a set of power state parameters at least partly defining when a wireless terminal is to be in an active state or a power saving state, the method comprising the steps of:
    detecting a present traffic type of a traffic flow to or from a wireless terminal;
    obtaining, from a power state parameter repository, a set of power state parameters corresponding to a plurality of traffic types, including the present traffic type, wherein the plurality of traffic types is in the form of a sequence of traffic types, wherein an initial set of traffic types of the sequence of traffic types, comprises the present traffic type;

transmitting the set of power state parameters to the wireless terminal;

detecting a further traffic type of a traffic flow to or from the wireless terminal;

modifying the power state parameters for the wireless terminal, only when the further traffic type does not comply with at least one expected future traffic type of the plurality of traffic types; and determining, for at least one initial set of traffic types, a sequence of most likely future traffic types, wherein the sequence ends when an expected sequence duration exceeds a threshold value.

12. The method according to claim 11, wherein in the step of obtaining a set of power state parameters, the initial set of traffic types further comprises at least one previous traffic type.

13. The method according to claim 11, wherein the step of determining a sequence comprises determining the sequence of most likely traffic types based on data associated with the wireless terminal which is associated with the traffic flow in the step of detecting a present traffic type.

14. The method according to claim 11, wherein the step of determining a sequence comprises determining the sequence of most likely traffic types based on data without discrimination on wireless terminals.

15. The method according to claim 11, wherein the step of determining a sequence comprises determining the sequence of most likely traffic types based on data for a subset of wireless terminals comprising the wireless terminal.

* * * * *